(12) United States Patent
Maeshiro (10) Patent No.: US 11,571,996 B2
(45) Date of Patent: Feb. 7, 2023

(54) SUSPENDED VEHICLE SEATING SYSTEM

(71) Applicant: HONDA MOTOR CO., LTD., Tokyo (JP)

(72) Inventor: Shinji Maeshiro, Cypress, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 649 days.

(21) Appl. No.: 16/684,315

(22) Filed: Nov. 14, 2019

(65) Prior Publication Data
US 2021/0146812 A1     May 20, 2021

(51) Int. Cl.
*B60N 2/50*     (2006.01)
*B60N 2/56*     (2006.01)
*B60N 2/02*     (2006.01)
*B60N 2/14*     (2006.01)

(52) U.S. Cl.
CPC ........... *B60N 2/501* (2013.01); *B60N 2/0252* (2013.01); *B60N 2/146* (2013.01); *B60N 2/503* (2013.01); *B60N 2/509* (2013.01); *B60N 2/5628* (2013.01); *B60N 2002/0268* (2013.01); *B60N 2002/0272* (2013.01)

(58) Field of Classification Search
CPC .............. B60N 2/5628; B60N 2/01508; B60N 2/01516; B60N 2/01583; B60N 2/501; B60N 2/0252; B60N 2/503; B60N 2/509; B60N 2002/0268; B60N 2/146; B60N 2/0735
See application file for complete search history.

(56) References Cited

U.S. PATENT DOCUMENTS 3,922,029 A * 11/1975 Urai .................... B60N 2/4214
                                             296/68.1
6,491,578 B2 * 12/2002 Yoshinori .......... B60H 1/00007
                                             165/203
7,112,022 B1 * 9/2006 McLoughlin .......... A61G 3/003
                                             410/97
7,281,971 B2   10/2007 Tohda et al.
(Continued)

FOREIGN PATENT DOCUMENTS

CN        104527680 A     4/2015
DE      102015210624    * 12/2016
(Continued)

OTHER PUBLICATIONS

The Economic Times, Author: Runa Mukherjee Parikh, article titled "Futuristic National Institute of Design's ideas has hanging seats in cars" dated Dec. 30, 2013.

*Primary Examiner* — Milton Nelson, Jr.
(74) *Attorney, Agent, or Firm* — ArentFox Schiff LLP (57) ABSTRACT

Examples herein describe a vehicle seating system. The vehicle seating system may include a rail mounted to a vehicle roof and supported by a vehicle frame. The vehicle seating system may include an anchor system movable along the rail, the anchor system including: a locking device that locks the anchor system in a position along the rail; and a heating, vacuuming, and air conditioning (HVAC) port in communication with a HVAC duct within the vehicle roof. The vehicle seating system may include an interchangeable seat module that connects to the anchor system to suspend the seat module above a floor of the vehicle, wherein the seat module connects to the HVAC port.

20 Claims, 6 Drawing Sheets

(56) References Cited

U.S. PATENT DOCUMENTS

| | | | |
|---|---|---|---|
| 8,382,181 B2* | 2/2013 | Bourgraf | A61G 3/0218 |
| | | | 296/65.13 |
| 9,050,915 B2* | 6/2015 | Hoyle | B60N 2/509 |
| 9,931,966 B2* | 4/2018 | Jacquemont | B60R 22/12 |
| 2004/0074414 A1* | 4/2004 | Phillips | B61B 3/00 |
| | | | 104/93 |
| 2016/0082806 A1 | 3/2016 | Park | |
| 2016/0221414 A1 | 8/2016 | Nakumura et al. | |
| 2016/0221472 A1* | 8/2016 | Deshmukh | B60N 2/01 |
| 2018/0037141 A1 | 2/2018 | Huang et al. | |

FOREIGN PATENT DOCUMENTS

| | | |
|---|---|---|
| EP | 1916148 A1 | 4/2008 |
| EP | 2103478 A2 | 9/2009 |
| GB | 2465212 A | 5/2010 |
| JP | 2017/178277 A | 10/2017 |
| WO | WO 2008/096054 A2 | 8/2008 |
| WO | WO 2016/096419 A1 | 6/2016 |

\* cited by examiner

SUSPENDED VEHICLE SEATING SYSTEM

TECHNICAL FIELD

The present disclosure generally relates to seating, and in particular relates to vehicle seating used in transportation.

BACKGROUND

The subject matter disclosed herein relates to vehicle seating and, more particularly, to suspended seating.

Conventional passenger vehicles include driver-side and passenger-side front seats normally oriented facing a forward direction of travel. Vehicle seats generally include controls for adjusting the position of the seat. More advanced vehicle seats include power movement, adjustable lumbar support, adjustable side bolsters, seat and back heating, sound systems, and ventilation systems.

Passenger vehicle seating, however, is typically limited to fixed locations for each seat. For example, seats are arranged in forward facing rows. Even special purpose vehicles such as limousines typically have a fixed seating arrangement. In an autonomous vehicle, however, a fixed location for driver and/or passenger seats may not be necessary.

In view of the foregoing, a seating system including suspended modular seating units in a vehicle is provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a vehicle seating system. The vehicle seating system may include a rail mounted to a vehicle roof and supported by a vehicle frame. The vehicle seating system may include an anchor system movable along the rail, the anchor system including: a locking device that locks the anchor system in a position along the rail; and a heating, vacuuming, and air conditioning (HVAC) port in communication with a HVAC duct within the vehicle roof. The vehicle seating system may include an interchangeable seat module that connects to the anchor system to suspend the seat module above a floor of the vehicle, wherein the seat module connects to the HVAC port.

In another aspect, the disclosure provides a vehicle. The vehicle may include a plurality of wheels, at least one of the wheels driven by a motor or engine. The vehicle may include a vehicle frame supported on the plurality of wheels. The vehicle may include a rail mounted to a vehicle roof and supported by the vehicle frame. The vehicle may include an anchor system movable along the rail, the anchor system including: a locking device that locks the anchor system in a position along the rail; and a HVAC port in communication with a HVAC duct within the vehicle roof. The vehicle may include an interchangeable seat module that connects to the anchor system to suspend the seat module above a floor of the vehicle, wherein the seat module connects to the HVAC port.

In another aspect, the disclosure provides a method of controlling a vehicle seating system including an anchor system attached to a rail mounted to a roof of a vehicle, the anchor system including a robotic arm. The method may include connecting the robotic arm to an interchangeable seat module. The method may include moving the robotic arm along the rail to a selected position. The method may include predicting movement of the vehicle. The method may include moving the robotic arm opposite the movement of the vehicle to reduce movement of the seat module. The method may include monitoring a temperature of an occupant of the seat module. The method may include controlling HVAC port of the anchor system in response to the temperature.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In an aspect, the present disclosure includes a vehicle having a vehicle passenger area that is reconfigurable to meet the needs of the passengers. A vehicle seating system may include one or more seat modules that are suspended from a roof of the passenger area via an anchor system. The anchor system and seat module may include heating, vacuuming, and air conditioning (HVAC) ducts that provide individual climate control for a seat occupant.

An autonomous vehicle may impose fewer constraints on seating configuration because a fixed position and seat for a driver may not be necessary. An autonomous vehicle may be utilized for a mobility as a service (MaaS) scenario that may provide transportation for various people with different transportation needs. For example, an autonomous vehicle in a MaaS scenario may provide service for commuters, families, shoppers, or tourists, each person or group having different needs. For example, a family may require special seating for children and a shopper may require secure cargo storage. Additionally, a MaaS customer may have special needs such as a wheelchair. Accordingly, a modular seating system may be desirable to address the needs of different passengers.

Figure 1:
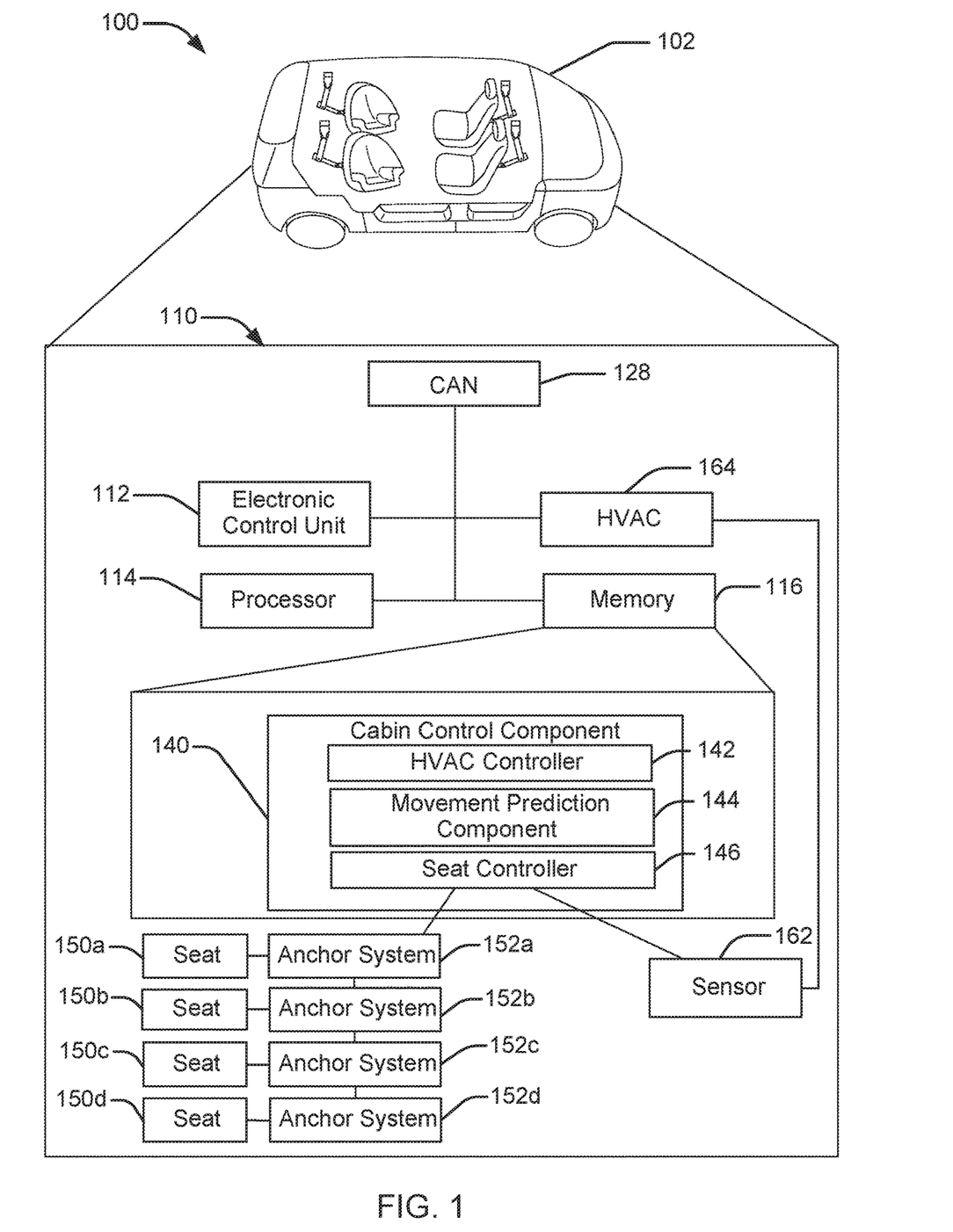
FIG. 1 illustrates a schematic view of an example operating environment of a vehicle seating system in accordance with aspects of the present disclosure.

Turning to FIG. 1, a schematic view of an example operating environment 100 of a vehicle seating control system 110 and example methods according to an aspect of the disclosure are provided. The vehicle seating control system 110 may reside within a vehicle 102. The components of the vehicle seating control system 110, as well as the components of other systems, hardware architectures, and software architectures discussed herein, may be combined, omitted or organized into various implementations.

The vehicle 102 may be a passenger vehicle. A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes a source of kinetic energy such as one or more engines or motors. In an aspect, the vehicle 102 may be an autonomous vehicle. In some variations, the vehicle 102 may be a level 5 autonomous vehicle having no human driver. Accordingly, a passenger area of the vehicle 102 may include seat modules 150 for all vehicle passengers. As discussed in further detail below, each seat modules may be individually suspended from a track via an anchor system 152 that may move along the track. In an aspect, the vehicle 102 may include at least two seat modules 150. In another aspect, the vehicle 102 may include three or more seat modules. The seats may be moved into various configurations as selected by the passengers. The passengers may select the configuration while the passengers are seated in the vehicle 102, and the vehicle seating system may rearrange the seats and passengers. The passengers may also remotely select a configuration (e.g., using a mobile device) and the vehicle seating system may rearrange the seats into the desired configuration prior to entry by the passengers. In an aspect, interchangeable seat modules may be selected for passengers. For example, when summoning the vehicle 102 in a MaaS scenario, the passengers may specify specific seat modules to be included.

In another aspect, the disclosed vehicle seating system may be used in a passenger area of a traditional passenger vehicle. For example, the vehicle seating system may be utilized in the rear portion of a van or limousine and a human driver may sit in a front portion. A human may facilitate changes in seating by moving seat modules into or out of the vehicle 102.

The vehicle 102 may generally include an electronic control unit (ECU) 112 that operably controls a plurality of vehicle systems. The vehicle systems may include, but are not limited to, the vehicle seating control system 110, among others, including vehicle body monitoring systems, vehicle HVAC systems, vehicle audio systems, vehicle video systems, vehicle infotainment systems, vehicle telephone systems, and the like. The vehicle seating control system 110 may also include a processor 114 and a memory 116 that communicate with the ECU 112, an HVAC system 164, and controller area network (CAN) 128.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle seating control system 110. A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area Network (CAN), Local Interconnect Network (LIN), among others.

The memory 116 may store instructions executable by the processor 114 for carrying out the methods described herein. A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM). A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Further, the memory 116 may store parameters for carrying out the methods described herein. For example, the memory 116 may store a cabin control component 140, which may include software executable by the processor 114 for operating the vehicle seating control system 110. The cabin configuration component 140 may also include an HVAC controller 142 that controls a vehicle HVAC system 164 and/or individual HVAC system of a seat module and a movement prediction component 144 that determines expected movements of the vehicle 102. The cabin configuration component 140 may include a seat controller 146 that generates control signals for controlling one or more anchor systems 152 to move the attached seat modules 150 based on input from the movement prediction component 144, the sensor 162, and/or user controls. The sensor 162 may be an infrared sensor that detects a position and/or temperature of a passenger. The sensor 162 may provide the temperature to the HVAC system 164 to provide individual climate control for the passenger. The sensor 162 may provide movement information to the seat controller 146, which may control the anchor system 152 to minimize movement to help prevent motion sickness.

The anchor systems 152 may control the location and orientation of the seat modules 150. Each anchor system 152a, 152b, 152c, 152d may support and control the corresponding seat module 150a, 150b, 150c, 150d. The anchor system 152 may, for example, receive commands from the seat controller 146 of the cabin control component 140. For example, short range wireless communication protocols such as Wi-Fi or Bluetooth may be used to transmit the commands. The anchor system 152 may then execute the commands by controlling motors or actuators of the anchor system 152.

The seat modules 150 may include various seating systems that may be connected to the anchor system. Example seat modules may include a massage chair, cocoon seat, or wheel chair. In an aspect, a wheel chair may be detached from the anchor system 152 to operate externally to the vehicle 102 without the passenger needing to transfer between the wheel chair and a vehicle seat. As another example, an infant carrier or a child seat may be a seat module 150 that connects to the anchor system 152. The anchor system 152 may lift an infant carrier or child seat from a stroller. In an aspect, a seat module 150 may be a cargo module that stores personal possessions of a passenger. For example, a cargo module may be a wheeled container that may be used for shopping and may be secured within the vehicle by the anchor system 152.

Figure 2:
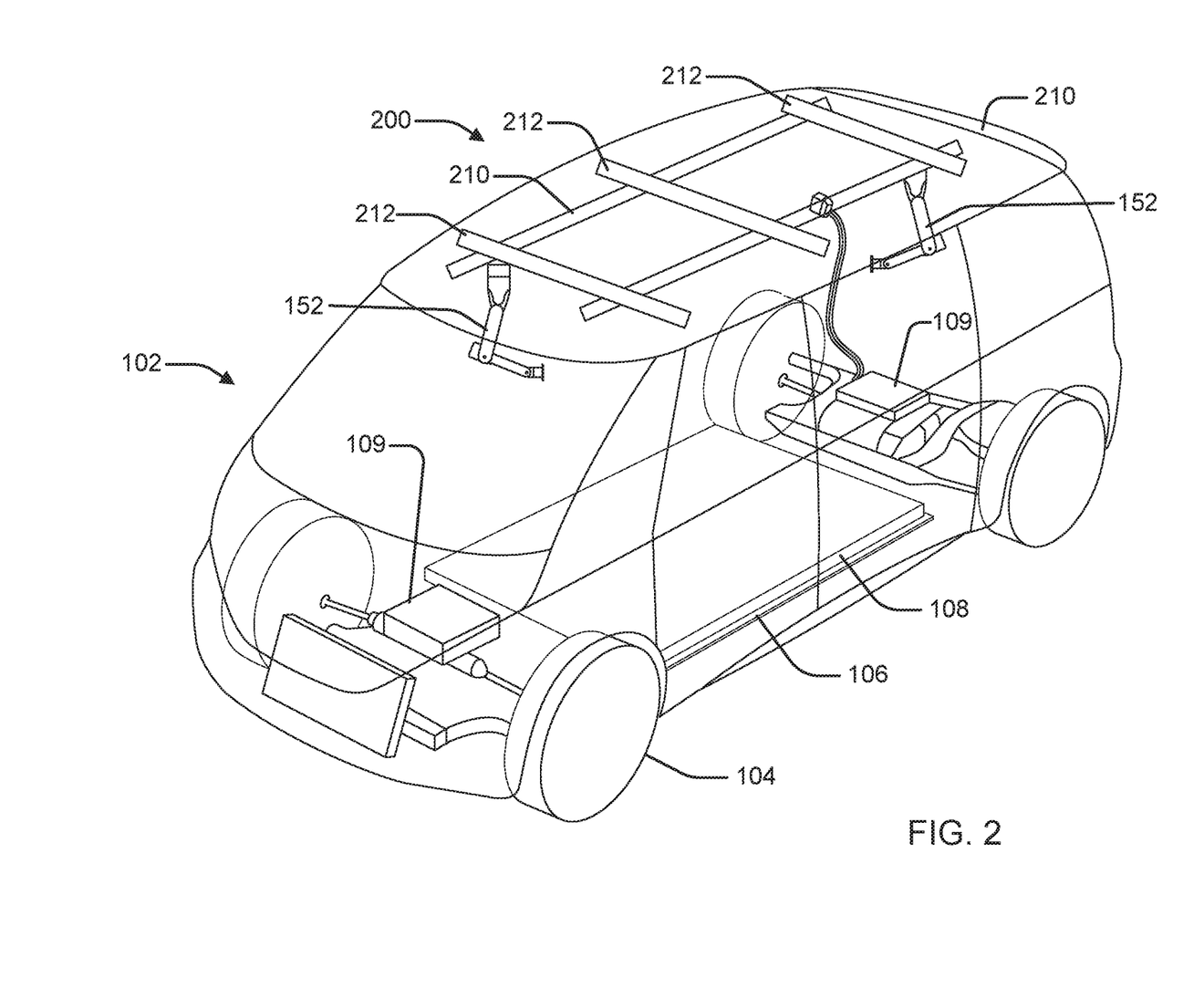
FIG. 2 illustrates an example vehicle including rails and anchor systems in accordance with aspects of the present disclosure.

FIG. 2 illustrates a perspective view of an example seat mounting system 200 in the vehicle 102 that may be controlled by the vehicle seating control system 110. The vehicle 102 may include a plurality of wheels 104 (e.g., at least three wheels) that support a floor 106 (e.g., via a suspension system) and a vehicle frame. In an aspect, the vehicle 102 may be an electric vehicle including a battery 108 and one or more motors 109.

The seat mounting system 200 may include one or more rails 210, 212 that support one or more anchor systems 152. For example, as illustrated, the seat mounting system 200 may include longitudinal rails 210 and lateral rails 212. In an aspect, the rails 210 and lateral rails 212 may be connected as a grid to allow an anchor system 152 to move longitudinally or laterally. It should be appreciated, however, that other arrangements of rails may be used. For example, the rails may be arranged as a circuit around a periphery of the seating area, an elliptical shape or a U-shape.

The rails 210, 212 may be attached to and supported by the vehicle frame, which may include structural columns or pillars. The rails 210, 212 may interconnect the structural columns or pillars of the vehicle frame. In an aspect, additional reinforcements such as aluminum or fiber reinforced polymer (FRP) structures may strengthen a roof of the vehicle. Accordingly, the roof may support the added weight of the seat mounting system 200, seat modules 150, and passengers. In an aspect, the battery 108 may be located on or under the floor 106 and provide a counter-balance to the weight of the roof.

The anchor systems 152 may be mounted to the rails 210, 212 in a manner that allows independent movement of each anchor system 152. For example, the rails 210, 212 may be slidably received within one or more brackets attached to a respective anchor system 152. Each anchor system 152 may include a drive mechanism (e.g., a motor and worm gear) that drives the anchor system 152 along the rails 210, 212 in either direction under control of the seat controller 146. The drive mechanism may also lock the anchor system 152 at a location along the track when the drive mechanism is not powered to drive the anchor system 152. Accordingly, each anchor system 152 may be securely mounted in a fixed location when not actively being moved by the seat controller 146. In another aspect, the anchor system 152 may include a locking mechanism that is separate from the drive mechanism. For example, the locking mechanism may include a solenoid that moves a shaft to engage an opening in one of the rails 210, 212.

Figure 3:
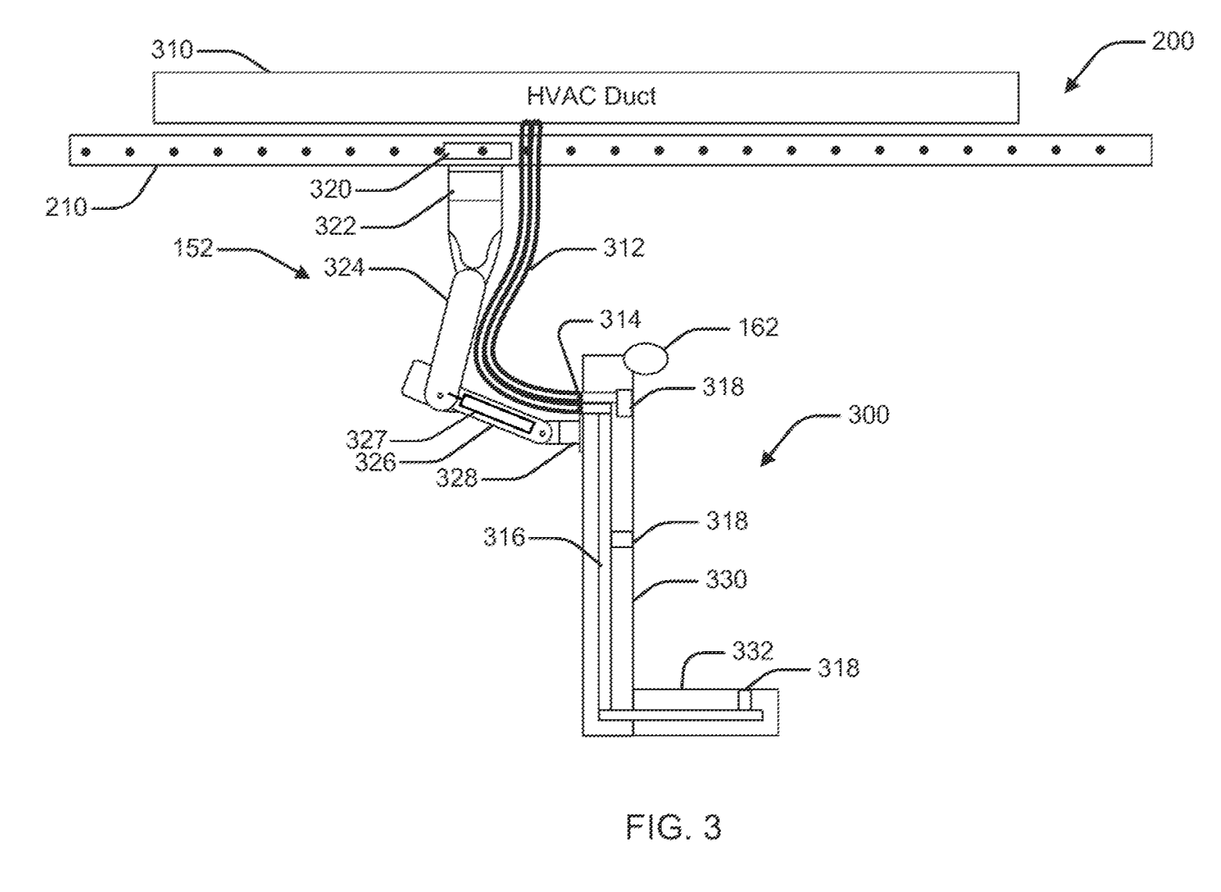
FIG. 3 illustrates an example anchor system and seat in accordance with aspects of the present disclosure.

FIG. 3 illustrates a side view of the example seat mounting system 200 and an example seat module 300, which may be an example of a seat module 150. In one aspect, the anchor system 152 may be mounted to the longitudinal rail 210. The seat mounting system 200 may further include a HVAC duct 310 that carries conditioned (e.g., warmed or cooled) air from a common location (e.g., a heat exchanger) to one or more of the anchor systems 152.

The anchor system 152 may couple the seat module 300 to the rail 210 at a selected position. In an aspect, the anchor system 152 may be a robotic arm that suspends the seat module 300 and allows control of the seat module 300. The anchor system 152 may include a locking mechanism 320 that locks the anchor system 152 at the selected position, a rotational joint 322 that rotates the anchor system 152 and seat module 300, a first robotic arm segment 324 and a second robotic arm segment 326, and a seat adapter 328. The anchor system 152 may also include an HVAC duct 312 that carries air from the HVAC duct 310 to the seat module 300.

The locking mechanism 320 may be located at a top end of the anchor system 152 and engage a feature of the rail 210. For example, the rail 210 may include regularly spaced openings, and the locking mechanism 320 may include a bolt that engages an opening to prevent movement of the anchor system along the rail 210. In an aspect, the locking mechanism 320 may include the drive mechanism that moves the anchor system 152 along the rail 210. For example, the locking mechanism 320 may disengage the bolt and drive a motor of the drive mechanism to change the position of the anchor system 152.

The anchor system 152 may include a rotational joint 322 that allows full rotation of the seat module 300. For example, the rotational joint 322 may include a swivel, universal joint, ball and socket, or track and ball bearings. In an aspect, the rotational joint 322 may be located at the top of the anchor system below the rail 210.

The first robotic arm segment 324 and the second robotic arm segment 326 may be suspended from the rotational joint 322. The first robotic arm segment 324 and the second robotic arm segment 326 may each include an actuator for rotating the respective segment. For example, the first robotic arm segment 324 may rotate with respect to the rotational joint 322, and the second robotic arm segment 326 may rotate with respect to the first robotic arm segment 324. The actuator may be, for example, an electric motor. In an aspect, the first robotic arm segment 324 and/or the second robotic arm segment 326 may include a biasing element 327 (e.g., a spring or pneumatic cylinder) that biases the robotic arm toward a neutral position when no current is applied to the actuators. For example, the neutral position may be a position that suspends the seat module 300 in a riding position. The biasing element 327 may also absorb shocks and reduce movement of the seat module 300.

The seat adapter 328 may detachably couple any seat module 150 to the anchor system 152. The seat adapter 328 may support the weight of the seat module 150, 300 and a passenger. The seat adapter 328 may prevent rotation between the second robotic arm segment 326 and the seat module 150, 300. As such, the seat adapter 328 may be a standardized connection, and each seat module 150, 300 may include a corresponding adapter.

The anchor system 152 may also couple the seat module 150, 300 to the HVAC system of the vehicle 102 including the HVAC duct 310. The HVAC duct 312 may be a flexible duct that extends along the anchor system 152. In an aspect, the HVAC duct 312 may be attached to an external surface of the first robotic arm segment 324 and/or the second robotic arm segment 326. In another aspect, the HVAC duct 312 may be located within an external case of the first robotic arm segment 324 and/or the second robotic arm segment 326. In an aspect, the HVAC duct 312 may include at least two lumens, one for conditioned air and one for vacuum. The HVAC duct 312 may end at an HVAC port 314. The HVAC port 314 may include an outlet for the conditioned air lumen and an inlet for the vacuum lumen.

The seat module 300 may include a seat back 330 and a seat bottom 332. The seat adapter 328 may connect to a corresponding adapter located in the seat back 330. The seat back 330 and seat bottom 332 may include one or more structural members to support the weight of a passenger. As discussed in further detail below, the seat module 300 may take various forms and may include seat features such as head rests, arm rests, a seat belt or harness, cup holders, etc. The seat module 300 may include an internal duct 316 that couples to the HVAC port 314. The internal duct 316 may distribute conditioned air to one or more vents 318 and/or suction air through one or more vents 318. For instance, as illustrated, the internal duct may carry conditioned air to a seat bottom and seat back, and may suction air near a headrest. In an aspect, providing both conditioned air and suction to the seat module 300 may maintain a comfortable temperature for a passenger. In an aspect, the seat module 300 may include a sensor 162, which may be an infrared sensor that senses the presence, position, and temperature of the passenger. The HVAC system may be controlled centrally or at the HVAC port 314 to adjust the airflow to maintain a temperature for the passenger.

In an aspect, the anchor system 152 may dampen movement of the seat module 300. Suspending the seat module 300 from the rail 210 may isolate the seat module 300 from the wheels 104 of the vehicle 102. Accordingly, vibrations due to road surfaces (e.g., bumps) may be dampened by the structural members of the vehicle 102 and the anchor system 152. In an aspect, the anchor system 152 may actively counter predicted movements of the vehicle 102. For example, when the vehicle 102 accelerates or decelerates, the robotic arm may move the seat module 300 in a direction opposite the acceleration or may slow an acceleration of the seat module 300.

The anchor system 152 may move to facilitate attachment of a seat module 150 and/or seating of a passenger. For example, the anchor system 152 may lower a seat module 150 to a height at which a passenger can easily sit during loading, then raise the seat module 150 for travel. As another example, the anchor system 152 may lower the seat adapter 328 for connection to a seat module 150. In an aspect, one or more seat modules 150 may be stored within the vehicle 102. For example, a child seat or wheelchair adapter may be stored on a rack within the vehicle 102 for use as needed. The cabin control component 140 may position the anchor system 152 near the rack, and the robotic arm may extend to connect the seat adapter 328 to the stored seat module 150. The robotic arm may then lift the seat module 150 from the rack.

Figure 4:
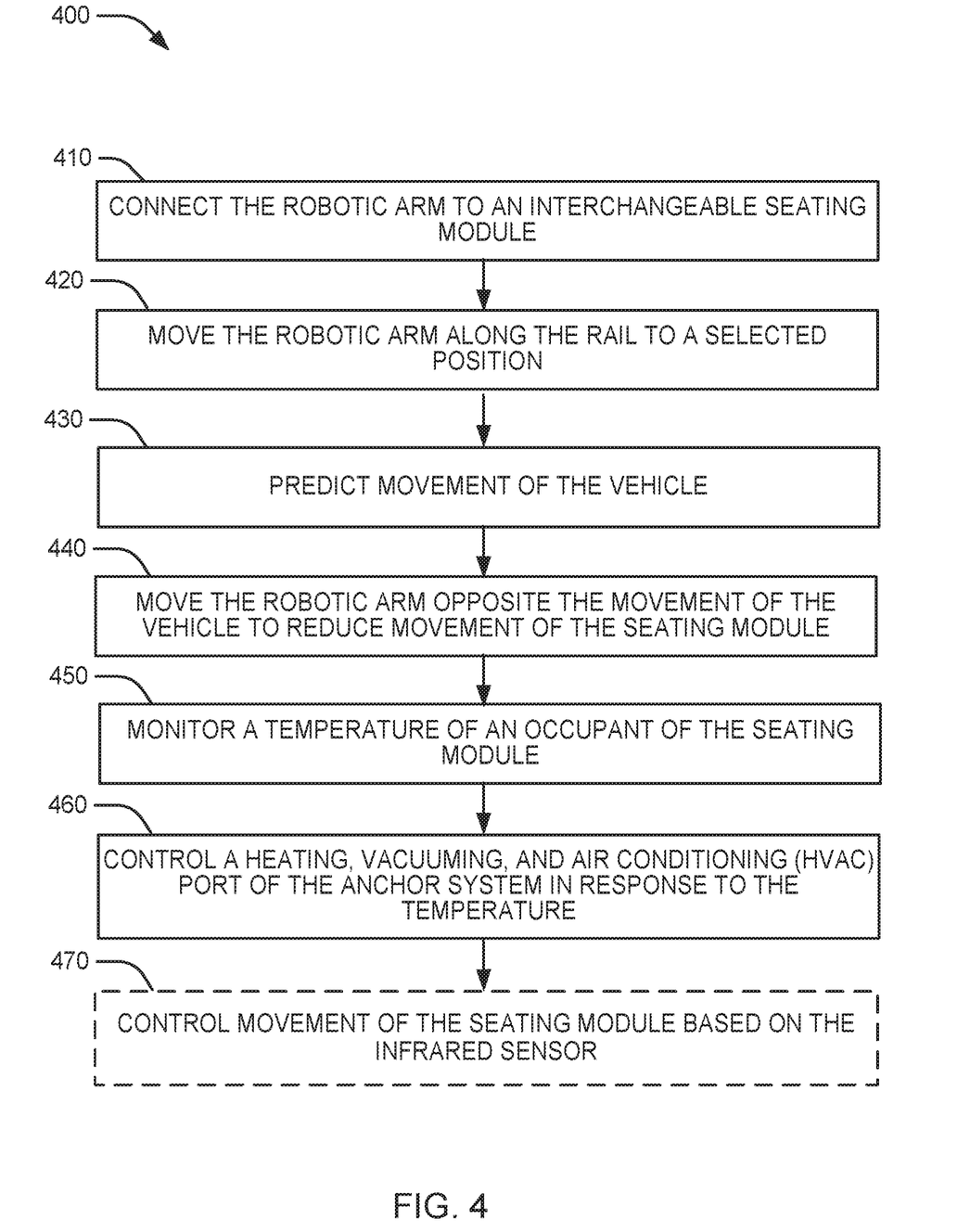
FIG. 4 is a flowchart of an example method of controlling a seating system of a vehicle in accordance with aspects of the present disclosure.

FIG. 4 illustrates a flowchart of an example method 400 for controlling a vehicle seating system. The method 400 may be performed by a cabin control component 140 in communication with other components of the vehicle seating control system 110 within a vehicle 102. The vehicle seating system may include an anchor system 152 attached to a rail 210, 212 mounted to a roof of the vehicle 102. The anchor system including a robotic arm (e.g., first robotic arm segment 324 and second robotic arm segment 326).

In block 410, the method 400 may include connecting the robotic arm to an interchangeable seat module. For example, the seat controller 146 may control the robotic arm to move the seat adapter 328 into contact with the seat module 150, 300. The seat controller 146 may control a locking mechanism of the seat adapter 328 to secure the seat adapter 328 to the seat module 150, 300.

In block 420, the method 400 may include moving the robotic arm along the rail to a selected position. In an aspect, for example, the seat controller 146 may control a drive mechanism of the anchor system 152 to move the robotic arm along the rail 210, 212 to a selected positon. The seat controller 146 may control the locking mechanism 320 to lock the anchor system 152 to the rail at the selected position.

In block 430, the method 400 may include predicting movement of the vehicle. In an aspect, for example, the movement prediction component 144 may predict movement of the vehicle 102. For example, the movement prediction component 144 may predict the movement of the vehicle 102 based on a planned route of the vehicle 102 include planned acceleration and deceleration as well as planned turns. In an aspect, the movement prediction component 144 may also predict sudden movements such as emergency braking. For example, the movement prediction component 144 may predict the movement based on the brake signal before the brakes have actually engaged and started to slow the vehicle.

In block 440, the method 400 may include moving the robotic arm opposite the movement of the vehicle to reduce movement of the seat module. In an aspect, for example, the seat controller 146 may move the robotic arm opposite the movement of the vehicle 102 to reduce movement of the seat module 150, 300. For example, where the movement prediction component 144 predicts deceleration due to braking, the seat controller 146 may control the robotic arm to move the seat module 150, 300 backward to reduce the tendency of the suspended seat module 150, 300 to sway forward.

In block 450, the method 400 may include monitoring a temperature of an occupant of the seat module with an infrared sensor. In an aspect, for example, the sensor 162 may monitor the temperature of the occupant of the seat module 150, 300. The sensor 162 may monitor periodically or continuously. For example, the sensor 162 may generate a signal indicating the current temperature of the occupant or the ambient temperature of the seat module 150, 300.

In block 460, the method 400 may include controlling a HVAC port of the anchor system in response to the temperature. In an aspect, for example, the HVAC controller 142 may control the HVAC port 314 of the anchor system 152 in response to the temperature. For example, if the HVAC system 164 is providing cooling and the temperature is below a desired temperature, the HVAC controller 142 may restrict the HVAC port 314 to provide less conditioned air. Conversely, the HVAC controller 142 may open the HVAC port 314 to provide increased cooling if the temperature is too high.

In block 470, the method 400 may optionally include controlling movement of the seat module based on the infrared sensor. In an aspect, for example, the seat controller 146 may control movement of the seat module 150, 300 based on the infrared sensor 162. For example, the seat controller 146 may attempt to minimize movement of the seat occupant to prevent motion sickness.

Figure 5:
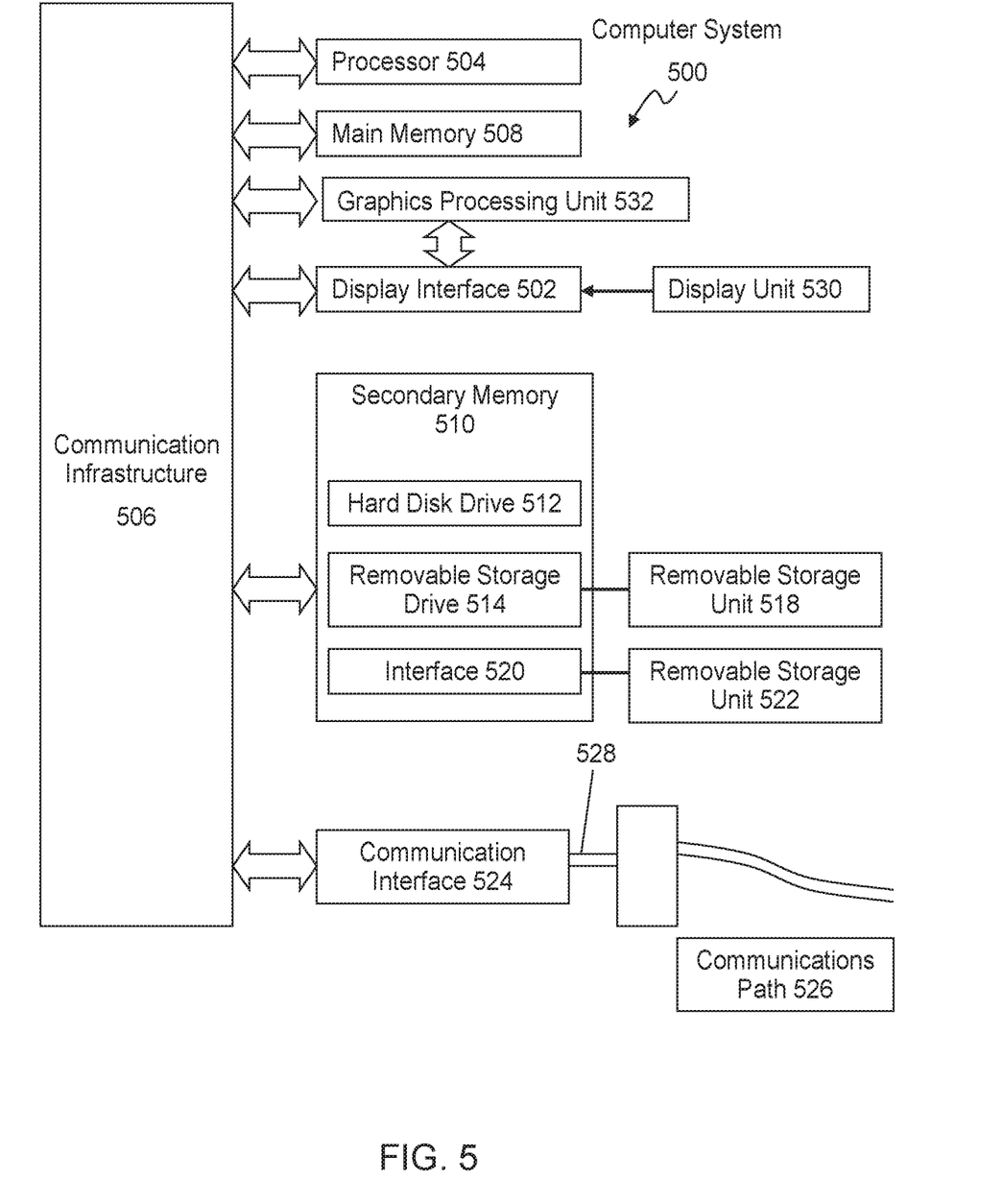
FIG. 5 presents an example system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the computer system may implement the cabin configuration component 140. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a graphics processing unit 532) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
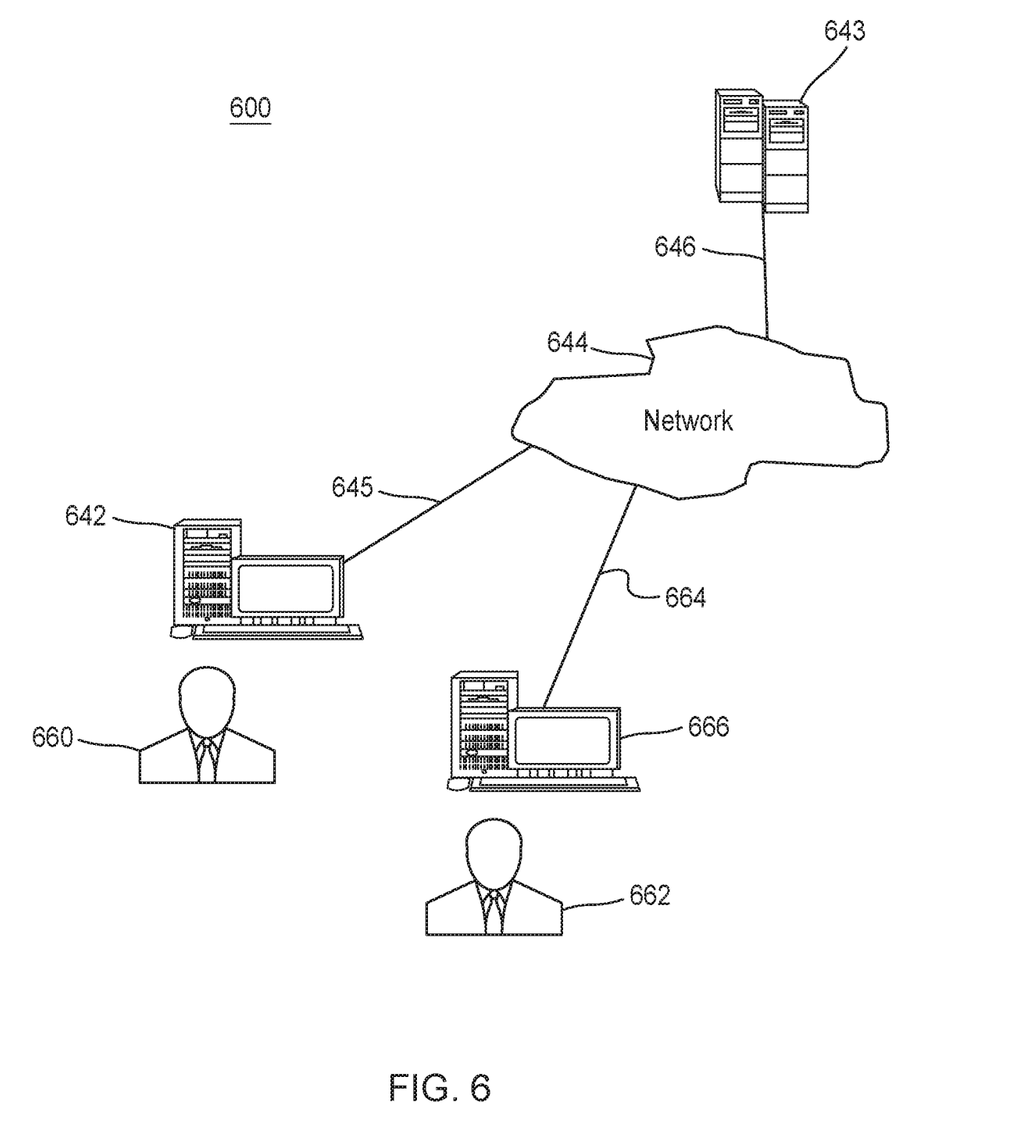
FIG. 6 is a block diagram of various example system components for use in accordance with aspects of the present disclosure.

FIG. 6 is a block diagram of various example system components that may be used in accordance with aspects of the present disclosure. For example, the various components may be within the vehicle 102, or only some of the components may be within the vehicle 102, and other components may be remote from the vehicle 102. The system 600 includes one or more accessors 660, 662 (also referred to interchangeably herein as one or more "users") and one or more terminals 642, 666 (such terminals may be or include, for example, various features of the vehicle seating control system 110). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A vehicle seating system, comprising:
a rail mounted to a vehicle roof and supported by a vehicle frame;
an anchor system movable along the rail, the anchor system including:
a locking device that locks the anchor system in a position along the rail; and
a heating, vacuuming, and air conditioning port in communication with a HVAC duct within the vehicle roof; and
an interchangeable seat module that connects to the anchor system to suspend the seat module above a floor of the vehicle, wherein the seat module connects to the heating, vacuuming, and air conditioning port.

2. The vehicle seating system of claim 1, wherein the anchor system includes a robotic arm.

3. The vehicle seating system of claim 2, wherein the anchor system includes a controller configured to reduce movement of the seat module based on predicted movement of the vehicle.

4. The vehicle seating system of claim 1, wherein the anchor system includes a biasing element that dampens movement between the seat module and the rail.

5. The vehicle seating system of claim 1, further comprising an infrared sensor configured to monitor a temperature of an occupant of the seat module, wherein the heating, vacuuming, and air conditioning port is controlled in response to the infrared sensor.

6. The vehicle seating system of claim 5, wherein the anchor system controls movement of the seat module based on the infrared sensor.

7. The vehicle seating system of claim 1, wherein the seat module includes internal ducts that circulate air from an outlet of the heating, vacuuming, and air conditioning port, through the internal duct, to a first vent, and from a second vent to an inlet of the heating, vacuuming, and air conditioning port.

8. The vehicle seating system of claim 1 wherein the anchor system includes a rotational joint allowing full rotation of the seat module.

9. The vehicle seating system of claim 1, wherein the seat module is one of a massage chair, cocoon seat, a wheel chair, or an infant carrier.

10. A vehicle, comprising:
a plurality of wheels, at least one of the wheels driven by a motor or engine;
a vehicle frame supported on the plurality of wheels;
a rail mounted to a vehicle roof and supported by the vehicle frame;
an anchor system movable along the rail, the anchor system including:
a locking device that locks the anchor system in a position along the rail; and
a heating, vacuuming, and air conditioning port in communication with a heating, vacuuming, and air conditioning duct within the vehicle roof; and
an interchangeable seat module that connects to the anchor system to suspend the seat module above a floor of the vehicle, wherein the seat module connects to the heating, vacuuming, and air conditioning port.

11. The vehicle of claim 10, wherein the anchor system includes a robotic arm.

12. The vehicle of claim 11, wherein the anchor system includes a controller configured to reduce movement of the seat module based on predicted movement of the vehicle.

13. The vehicle of claim 10, wherein the anchor system includes a biasing element that dampens movement between the seat module and the rail.

14. The vehicle of claim 10, further comprising an infrared sensor configured to monitor a temperature of an occupant of the seat module, wherein the heating, vacuuming, and air conditioning port is controlled in response to the infrared sensor.

15. The vehicle of claim 14, wherein the anchor system controls movement of the seat module based on the infrared sensor.

16. The vehicle of claim 10, wherein the seat module includes internal ducts that circulate air from an outlet of the heating, vacuuming, and air conditioning port, through the internal duct, to a first vent, and from a second vent to an inlet of the heating, vacuuming, and air conditioning port.

17. The vehicle of claim 10, wherein the anchor system includes a rotational joint allowing full rotation of the seat module.

18. The vehicle of claim 10, wherein the seat module is one of a massage chair, cocoon seat, a wheel chair, or an infant carrier.

19. A method of controlling a vehicle seating system including an anchor system attached to a rail mounted to a roof of a vehicle, the anchor system including a robotic arm, the method comprising:
connecting the robotic arm to an interchangeable seat module;
moving the robotic arm along the rail to a selected position;
predicting movement of the vehicle;
moving the robotic arm opposite the movement of the vehicle to reduce movement of the seat module;
monitoring a temperature of an occupant of the seat module; and
controlling a heating, vacuuming, and air conditioning port of the anchor system in response to the temperature.

20. The method of claim 19, further comprising controlling movement of the seat module based on an infrared sensor.

* * * * *